United States Patent
Kwon

(10) Patent No.: US 7,610,137 B2
(45) Date of Patent: Oct. 27, 2009

(54) SHIFT CONTROL METHOD AND SYSTEM FOR AN AUTOMATIC TRANSMISSION

(75) Inventor: Hyuk Bin Kwon, Gunpo (KR)

(73) Assignee: Hyundai Motor Company, Seoul (KR)

( * ) Notice: Subject to any disclaimer, the term of this patent is extended or adjusted under 35 U.S.C. 154(b) by 795 days.

(21) Appl. No.: 11/016,209

(22) Filed: Dec. 17, 2004

(65) Prior Publication Data
US 2005/0137771 A1 Jun. 23, 2005

(30) Foreign Application Priority Data
Dec. 22, 2003 (KR) .................. 10-2003-0094599

(51) Int. Cl.
*G06F 17/00* (2006.01)
(52) U.S. Cl. ................ 701/51; 701/55; 475/116; 475/127
(58) Field of Classification Search ............. 701/51–59, 701/65, 70; 477/102, 107, 109–125, 129–133; 74/335
See application file for complete search history.

(56) References Cited

U.S. PATENT DOCUMENTS

| 5,031,100 | A | * | 7/1991 | Takahashi | ............ 701/55 |
|---|---|---|---|---|---|
| 5,035,159 | A | * | 7/1991 | Shibayama | ........... 477/143 |
| 5,086,666 | A | * | 2/1992 | Moriki | ............. 477/109 |
| 5,593,365 | A | * | 1/1997 | Tabata et al. | ........ 477/119 |
| 5,730,683 | A | * | 3/1998 | Usuki et al. | ......... 477/143 |
| 6,689,017 | B2 | * | 2/2004 | Ishiguro et al. | ..... 477/120 |
| 2002/0058569 | A1 | * | 5/2002 | Ishiguro et al. | ..... 477/120 |
| 2005/0137771 | A1 | * | 6/2005 | Kwon | ............... 701/51 |

FOREIGN PATENT DOCUMENTS

| DE | 69420640T | 6/2000 |
|---|---|---|
| EP | 0622570 | 11/1994 |
| EP | 0634591 | 1/1995 |
| JP | 09-210193 | 8/1997 |
| JP | 2003-329123 | 11/2003 |

\* cited by examiner

*Primary Examiner*—Thomas G Black
*Assistant Examiner*—Wae Louie
(74) *Attorney, Agent, or Firm*—Morgan, Lewis & Bockius LLP

(57) ABSTRACT

The shift control method for an automatic transmission uses a shift pattern including at least one vehicle-speed-relevant shift line and at least one throttle-opening-relevant shift line for specific gear-shifting depending on a vehicle speed and a throttle opening. The method includes selecting a shift line from the at least one vehicle-speed-relevant shift line and the at least one throttle-opening-relevant shift line, on the basis of a vehicle speed change and a throttle opening change for a predetermined time, and performing a shift control according to the selected shift line.

13 Claims, 6 Drawing Sheets

SHIFT CONTROL METHOD AND SYSTEM FOR AN AUTOMATIC TRANSMISSION

CROSS REFERENCE TO RELATED APPLICATION

This application claims priority to Korean Application No. 10-2003-0094599, filed on Dec. 22, 2003, the disclosure of which is incorporated herein by reference.

TECHNICAL FIELD OF THE INVENTION

The present invention relates to a shift control method for an automatic transmission for vehicles, and more particularly, to a method in which shift control is performed according to different shift lines on the basis of a vehicle's change in speed and change in throttle opening.

BACKGROUND OF THE INVENTION

Generally, an automatic transmission for vehicles controls shifting to automatically attain an optimal shift speed based on the driving conditions.

As is known in the art, a shift control is basically performed according to a shift pattern including a plurality of shift lines defined as a function of throttle opening and vehicle speed. More particularly, conventional shift pattern for a shift control is composed of two kinds of shift lines, upshift lines and downshift lines.

Because the upshift line of the conventional shift pattern is optimally determined mainly with respect to the vehicle speed change, it cannot provide an optimal shift pattern for an upshift due to a throttle opening change such as a lift-foot-up (LFU) upshift. For example, if a throttle change occurs in a third speed by a lift-foot-up (LFU), 3 to 4 to 5 to 6 upshifts are sequentially performed. Then, until a vehicle stops after the LFU, 6 to 5 to 4 to 3 to 2 to 1 downshifts are sequentially performed. That is, after the LFU, unnecessary downshifts are sequentially performed in a low vehicle speed. In particular, because a shift pattern for an automatic transmission having many shift speeds, such as a 6-speed or 7-speed automatic transmission, has many more shift lines, a small throttle opening change may cause frequent shifting.

In addition, the downshift line of the conventional shift pattern is optimally determined mainly with respect to a throttle opening change, it cannot provide an optimal shift pattern for a downshift due to a decrease of vehicle speed. That is, when a vehicle speed is decreased regardless of a driver's intention, e.g., when a vehicle drives upslope, a downshift does not occur even while vehicle speed decreases substantially. For example, when vehicle speed change occurs in a sixth speed under a state of about 40% of throttle opening, a downshift does not occur while vehicle speed decreases substantially.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

The present invention provides a shift control method of an automatic transmission in which a shift pattern is provided with upshift lines for a vehicle speed change and a throttle opening change and downshift lines for a vehicle speed change and a throttle opening change, and such shift lines can be tuned respectively. This allows an optimal shift to be realized using such shift lines under vehicle operating conditions and in addition unnecessary downshifts before a vehicle stops can be avoided.

An exemplary shift control method for an automatic transmission according to an embodiment of the present invention uses a shift pattern including at least one vehicle-speed-relevant shift line and at least one throttle-opening-relevant shift line for specific gear-shifting depending on a vehicle speed and a throttle opening, and comprises: selecting a shift line from the at least one vehicle-speed-relevant shift line and the at least one throttle-opening-relevant shift line, on the basis of a vehicle speed change and a throttle opening change for a predetermined time; and performing a shift control according to the selected shift line.

In another embodiment of the present invention, the selecting comprises: calculating the vehicle speed change and the throttle opening change for the predetermined time; selecting one reference gradient from a plurality of predetermined reference gradients, on the basis of the calculated vehicle speed change and the calculated throttle opening change; and selecting one shift line from the at least one vehicle-speed-relevant shift line and the at least one throttle-opening-relevant shift line, on the basis of a comparison of an operating point changing gradient and the selected reference gradient, the operating point changing gradient being calculated as a ratio of the calculated throttle opening change to the vehicle speed change.

The plurality of reference gradients may comprise: a first reference gradient for a case when a vehicle speed change and a throttle opening change are respectively positive values; a second reference gradient for a case when the vehicle speed change is a positive value and the throttle opening change is a negative value; a third reference gradient for a case when a vehicle speed change and a throttle opening change are respectively negative values; and a fourth reference gradient for a case when the vehicle speed change is a negative value and the throttle opening change is a positive value.

In a further embodiment of the present invention, when the calculated vehicle speed change and the calculated throttle opening change are respectively positive values, the selecting one reference gradient selects the first reference gradient, and the selecting one shift line selects the throttle-opening-relevant shift line if the operating point changing gradient is greater than the first reference gradient and selects the vehicle-speed-relevant shift line if the operating point changing gradient is not greater than the first reference gradient.

In a further embodiment of the present invention, when the calculated vehicle speed change is a positive value and the calculated throttle opening change is a negative value, the selecting one reference gradient selects the second reference gradient, and the selecting one shift line selects the throttle-opening-relevant shift line if the operating point changing gradient is less than the second reference gradient and selects the vehicle-speed-relevant shift line if the operating point changing gradient is not less than the second reference gradient.

In a further embodiment of the present invention, when the calculated vehicle speed change and the calculated throttle opening change are respectively negative values, the selecting one reference gradient selects the third reference gradient, and the selecting one shift line selects the throttle-opening-relevant shift line if the operating point changing gradient is greater than the third reference gradient and selects the vehicle-speed-relevant shift line if the operating point changing gradient is not greater than the third reference gradient.

In another embodiment of the present invention, when the calculated vehicle speed change is a negative value and the calculated throttle opening change is a positive value, the selecting one reference gradient selects the fourth reference gradient, and the selecting one shift line selects the throttleopening-relevant shift line if the operating point changing gradient is less than the fourth reference gradient and selects the vehicle-speed-relevant shift line if the operating point changing gradient is not less than the fourth reference gradient.

An exemplary shift control method for an automatic transmission according to an embodiment of the present invention uses a shift pattern including at least one vehicle-speed-relevant shift line and at least one throttle-opening-relevant shift line for specific gear-shifting depending on a vehicle speed and a throttle opening. One reference gradient is selected from a plurality of reference gradients depending on whether a vehicle speed change and a throttle opening change for a predetermined time are a positive value or a negative value, and one shift line is selected from at least one vehicle-speed-relevant shift line and at least one throttle-opening-relevant shift line on the basis of a comparison of an operating point changing gradient and the selected reference gradient. The operating point changing gradient is calculated as a ratio of the calculated throttle opening change to the vehicle speed change.

In a further embodiment of the present invention, the plurality of reference gradients comprise: a first reference gradient for a case when a vehicle speed change and a throttle opening change are respectively positive values; a second reference gradient for a case when the vehicle speed change is a positive value and the throttle opening change is a negative value; a third reference gradient for a case when a vehicle speed change and a throttle opening change are respectively negative values; and a fourth reference gradient for a case when the vehicle speed change is a negative value and the throttle opening change is a positive value. When the calculated vehicle speed change and the calculated throttle opening change are respectively positive values, the shift control may be performed according to the throttle-opening-relevant shift line if the operating point changing gradient is greater than the first reference gradient and according to the vehicle-speed-relevant shift line if the operating point changing gradient is not greater than the first reference gradient. When the calculated vehicle speed change is a positive value and the calculated throttle opening change is a negative value, the shift control may be performed according to the throttle-opening-relevant shift line if the operating point changing gradient is less than the second reference gradient and according to the vehicle-speed-relevant shift line if the operating point changing gradient is not less than the second reference gradient. When the calculated vehicle speed change and the calculated throttle opening change are respectively negative values, the shift control may be performed according to the throttle-opening-relevant shift line if the operating point changing gradient is greater than the third reference gradient and according to the vehicle-speed-relevant shift line if the operating point changing gradient is not greater than the third reference gradient. When the calculated vehicle speed change is a negative value and the calculated throttle opening change is a positive value, the shift control may be performed according to the throttle-opening-relevant shift line if the operating point changing gradient is less than the fourth reference gradient and according to the vehicle-speed-relevant shift line if the operating point changing gradient is not less than the fourth reference gradient.

An exemplary shift control system for an automatic transmission according to an embodiment of the present invention comprises: at least one sensor including a vehicle speed sensor for detecting a vehicle speed and a throttle position sensor for detecting a throttle opening; a control unit for performing a shift control on the basis of signals from the at least one sensor; and a shift control actuator for performing a specific shift in response to the shift control of the control unit. The control unit stores a plurality of reference gradients depending on whether a vehicle speed change and a throttle opening change for a predetermined time are a positive value or a negative value and at least one vehicle-speed-relevant shift line and at least one throttle-opening-relevant shift line for specific gear-shifting depending on a vehicle speed and a throttle opening. The control unit executes instructions for performing each step of shift control methods according to embodiments of the present invention.

BRIEF DESCRIPTION OF THE DRAWINGS

The accompanying drawings, which are incorporated in and constitute a part of the specification, illustrate an embodiment of the invention, and, together with the description, serve to explain the principles of the invention, where:

FIG. 2 shows a shift process in a lift-foot-up (LFU), and FIG. 3 shows a shift process responding to throttle opening change and vehicle speed change;

DETAILED DESCRIPTION OF THE PREFERRED EMBODIMENTS

Hereinafter, a preferred embodiment of the present invention will be described in detail with reference to the accompanying drawings.

Figure 1:
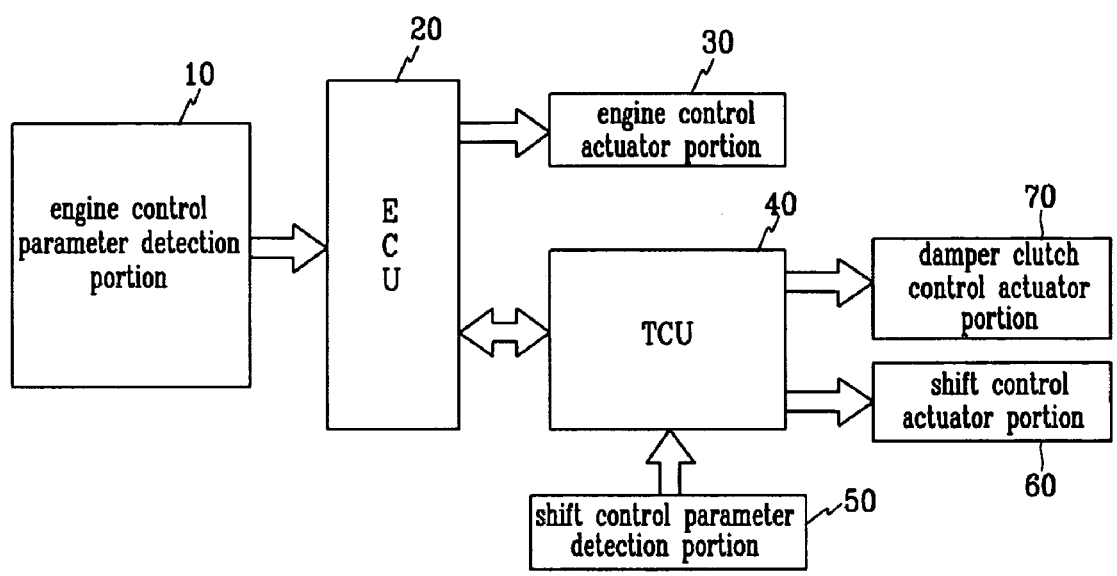
FIG. 1 is a block diagram of a shift control system according to an embodiment of the present invention for performing a shift control method according to an embodiment of the present invention.

FIG. 1 is a block diagram of a shift control system according to an embodiment of the present invention for performing a shift control method according to an embodiment of the present invention. To operate an engine efficiently, various information on current driving conditions of a vehicle are detected by an engine control parameter detection portion 10, and are input to an engine control unit (ECU) 20, the ECU 20 controls an engine control actuator portion 30 on the basis of the input information and pre-stored data.

In addition, the ECU 20 transmits various information, which is necessary for a shift control, to a transmission control unit (TCU) 40. TCU(40) controls a shift control actuator portion 60 and a damper clutch control actuator portion 70, on the basis of information input from the ECU 20, information input from a shift control parameter detection portion 50, and pre-stored data, such that an optimal shift control can be performed.

The TCU 40 preferably includes a processor, a memory, and other necessary hardware and software components as will be understood by persons skilled in the art, to permit the control unit to communicate with sensors and execute the control functions described herein. For example, the processor may be configured to be activated by predetermined programs that can be programmed to execute instructions for performing each corresponding step of a method according to an embodiment of the present invention.

The engine control parameter detection portion 10 comprises at least one sensor for detecting various parameters for controlling an engine. For example, as is obvious in the art, the engine control parameter detection portion 10 may include various sensors such as: a vehicle speed sensor for detecting a vehicle speed; a crank angle sensor for detecting a crank angle; an engine rpm sensor for detecting an engine rpm; a coolant temperature sensor for detecting a coolant temperature; a turbine rpm sensor for detecting a turbine rpm; and a throttle position sensor for detecting a throttle opening.

The shift control parameter detection portion 50 comprises at least one sensor for detecting various parameters for performing a shift control. For example, as is obvious in the art, the shift control parameter detection portion 50 may include various sensors such as: a transmission input shaft rpm sensor for detecting an rpm of a transmission input shaft; an automatic transmission fluid (ATF) temperature sensor for detecting an ATF temperature; an inhibitor switch for detecting a current shift range; and a brake switch.

The engine control actuator portion 30 may include any actuator for an engine control. The shift control actuator portion 60 may include solenoid valves for a hydraulic control of an automatic transmission, and shifting is realized through operations of such solenoid valves. The damper clutch control actuator portion 70 may include a solenoid valve for controlling operation of a damper clutch. A direction connection of the damper clutch is controlled through a hydraulic control of the solenoid value.

The TCU 40 is interconnected to the ECU 20 to receive various information, and for example, the TCU 40 may be connected to the ECU 20 through CAN (controller area network) communication. For example, the TCU 40 may perform a shift control method according to an embodiment of the present invention, on the basis of a vehicle speed signal of the vehicle speed sensor and a throttle opening signal of the throttle position sensor.

Hereinafter, referring to FIGS. 2 to 6, a shift control method according to an embodiment of the present invention will be explained in detail. Although a horizontal axis is indicated by a transmission output shaft rpm number in shift patterns shown in FIGS. 2 and 3, as is known in the art, the vehicle speed is easily calculated from the transmission output shaft through a simple calculation. Therefore, the vehicle speed is directly related to the transmission output shaft speed. Hereinafter, only a vehicle speed is used for ease of explanation.

Figure 2:
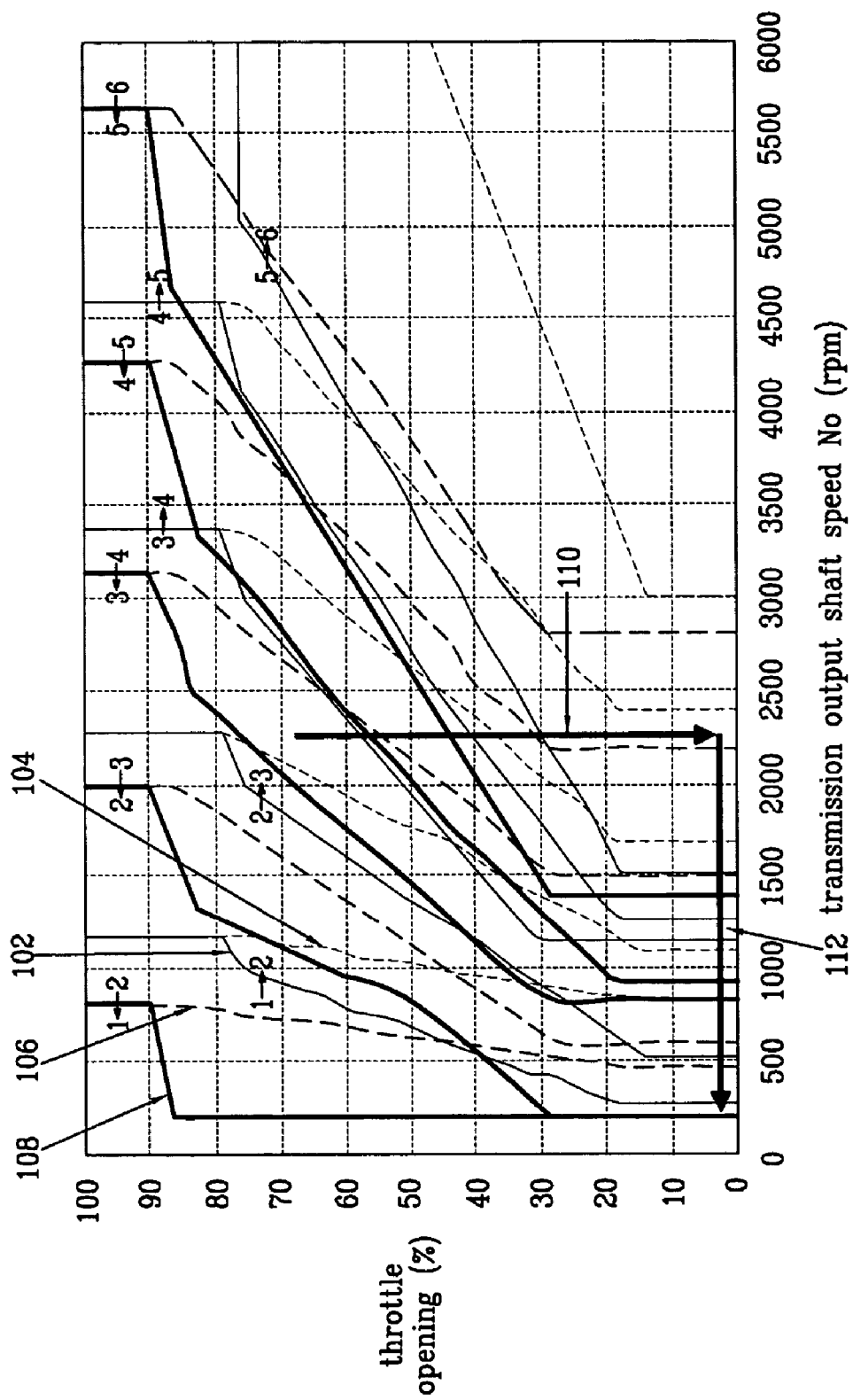
FIGS. 2 and 3 are shift patterns for realizing a shift control method according to an embodiment of the present invention.

FIG. 2 shows an example of a shift pattern for realizing a shift control method according to an embodiment of the present invention. As shown in FIG. 2, the shift pattern for the shift control according to an embodiment of the present invention includes four kinds of shift lines. As is known in the art, the shift line of the shift pattern provides specific gear-shifting schemes depending on vehicle speed and throttle opening.

In an embodiment of the present invention, the shift pattern includes at least one vehicle-speed-relevant shift line and at least one throttle-opening-relevant shift line for specific gear-shifting depending on vehicle speed and throttle opening. More particularly, the shift pattern may include a vehicle-speed-relevant upshift line (shift lines shown in a solid line) 102, a throttle-opening-relevant upshift line (shift lines shown in a dotted line) 104, a vehicle-speed-relevant downshift line (shift lines shown in a bolded dotted line) 106, and a throttle-opening-relevant downshift line (shift lines in a bolded solid line) 108. The vehicle-speed-relevant upshift line 102 and the vehicle-speed-relevant downshift line 106 are mainly related to a vehicle speed change, and the throttle-opening-relevant upshift line 104 and the throttle-opening-relevant downshift line 108 are mainly related to a throttle opening change.

At this time, the vehicle-speed-relevant upshift line 102 may be set to be equal to an upshift line of a conventional shift pattern, and the throttle-opening-relevant downshift line 108 may be set to be equal to a downshift line of the conventional shift pattern.

The shift lines are suitably determined through tunings according to characteristics of a vehicle to which a shift control method is applied, and the determined shift lines are stored in the TCU 40. The TCU 40 performs an optimal shift control according to vehicle driving conditions using the stored shift lines. For example, if the shift lines of the shift pattern are determined as shown in FIG. 2, and if a throttle opening change 110 occurs previously and then a vehicle speed change 120 occurs subsequently, the TCU 40 selects the throttle-opening-relevant shift line for the throttle opening change 110 and selects the vehicle-speed-relevant shift line for the vehicle speed change 120. Methods for selecting one shift line from the throttle-opening-relevant opening-relevant shift and the vehicle-speed-relevant shift line will be explained below. If the throttle-opening-relevant shift line is selected for the throttle opening change 110, only a 3 to 4 upshift occurs for the throttle opening change 110 that may be resulted by a lift-foot-up in a third gear. In addition, if the vehicle-speed-relevant shift line is selected for the vehicle speed change 120, only 4 to 3 to 2 to 1 downshifts may occur to stop the vehicle. Therefore, a number of unnecessary downshifts may be decreased, when compared to the conventional shift control method.

Figure 3:
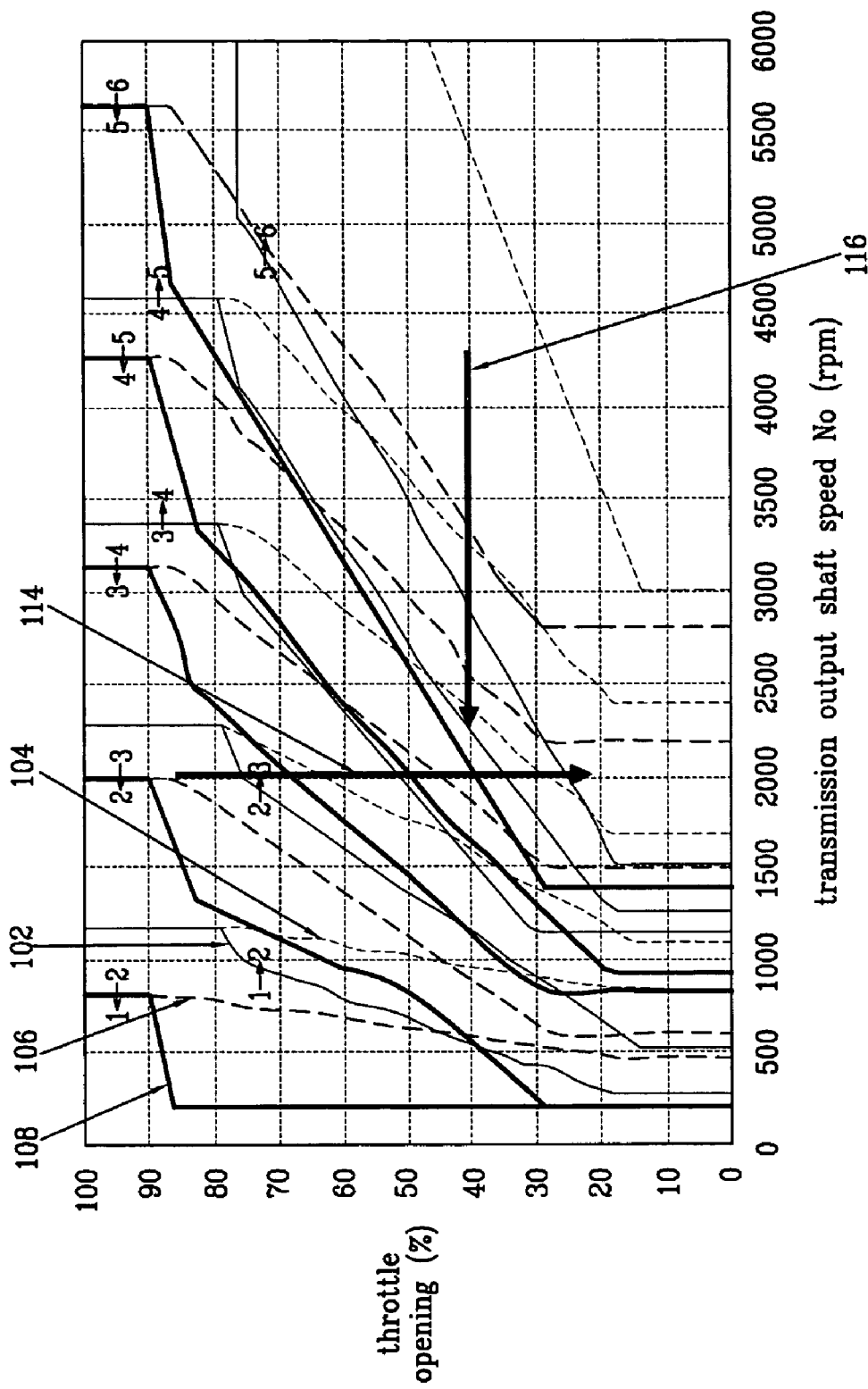

In addition, if a throttle opening change 114 occurs as shown in FIG. 3, the TCU 40 selects the throttle-opening-relevant shift line for a shift control responding to the throttle opening change 114. Therefore, only 3 to 4 to 3 shifts occur for the throttle opening change 114. However, according to the conventional shift pattern, 3 to 4 to 5 to 6 to 5 to 4 to 3 shifts occur for the throttle opening change 114. Consequently, unnecessary shifts for a throttle opening change decrease substantially. Further, if a vehicle speed change 116 occurs as shown in FIG. 3, the TCU 40 selects the vehicle-speed-relevant shift line for a shift control responding to the vehicle speed change 116. Accordingly, 6 to 5 to 4 downshifts occur for the vehicle speed change 116. Therefore, a driving force can be effectively obtained.

Figure 4:
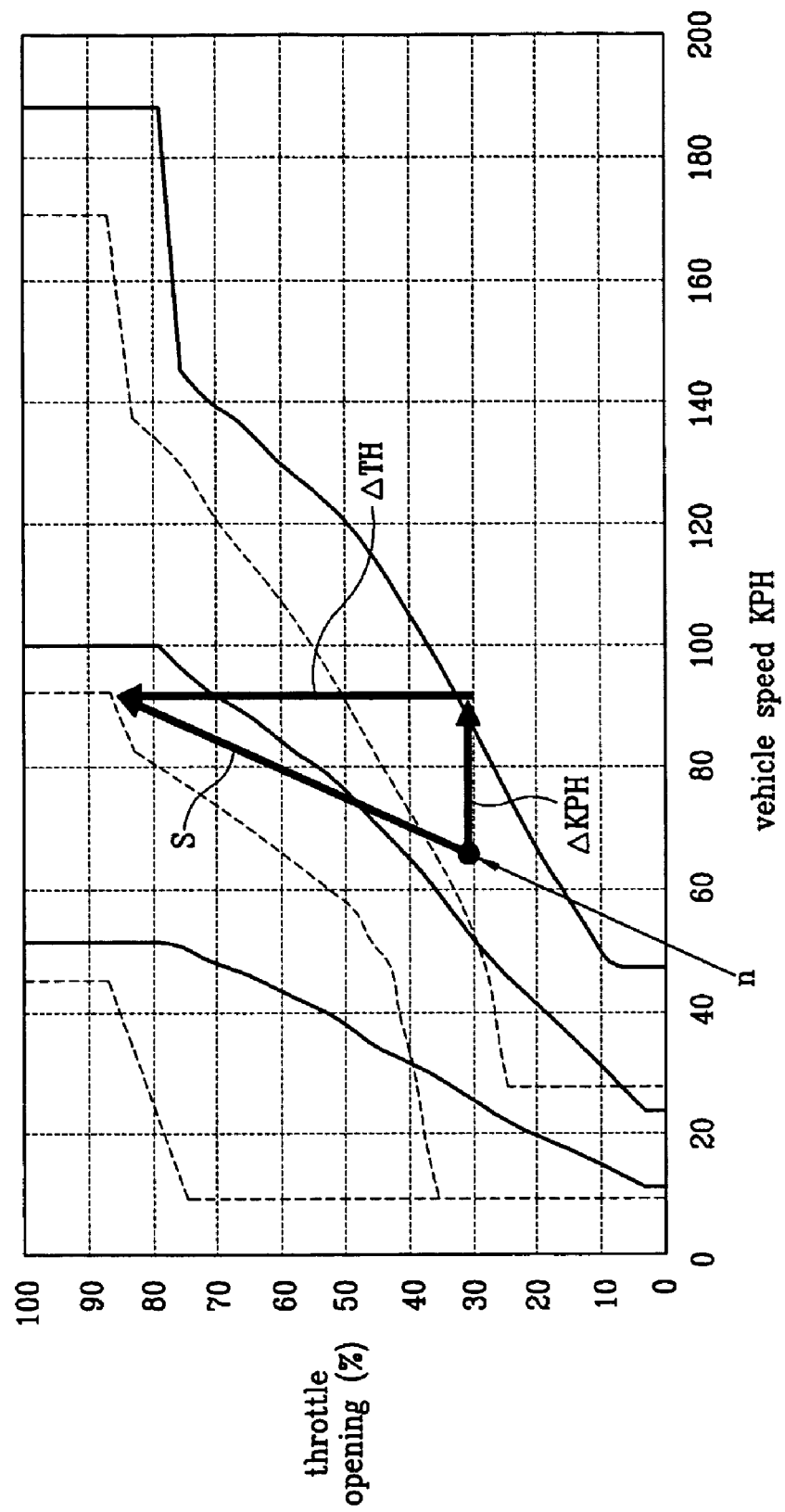
FIG. 4 illustrates a method for determining an operating point changing gradient on the basis of vehicle speed change and throttle opening change for a shift control method according to an embodiment of the present invention.

For the shift control using the above-stated shift pattern, the TCU 40 calculates a throttle opening change $\Delta$TH and a vehicle speed change $\Delta$KPH for a predetermined time $\Delta$t that corresponds to a change of operating points. Such changes can be shown in the shift pattern, as shown in FIG. 4. That is, the TCU 40 calculates a throttle opening change $\Delta$TH and a vehicle speed change $\Delta$KPH between an operating point "n" and a next operating point "n+1" (time interval $\Delta$t).

The TCU 40 also calculates an operating point changing gradient S($=\Delta$TH/$\Delta$KPH), which is calculated as a ratio of the calculated throttle opening change to the vehicle speed change, and compares the calculated gradient S to one of the predetermined first, second, third, and fourth reference gradients A, B, C, and D. Then, the TCU 40 selects one shift line from the throttle-opening-relevant shift line and the vehicle-speed-relevant shift line, on the basis of the comparison of the calculated gradient S and one of the reference gradients, and performs a shift control according to the selected shift line.

Figure 5:
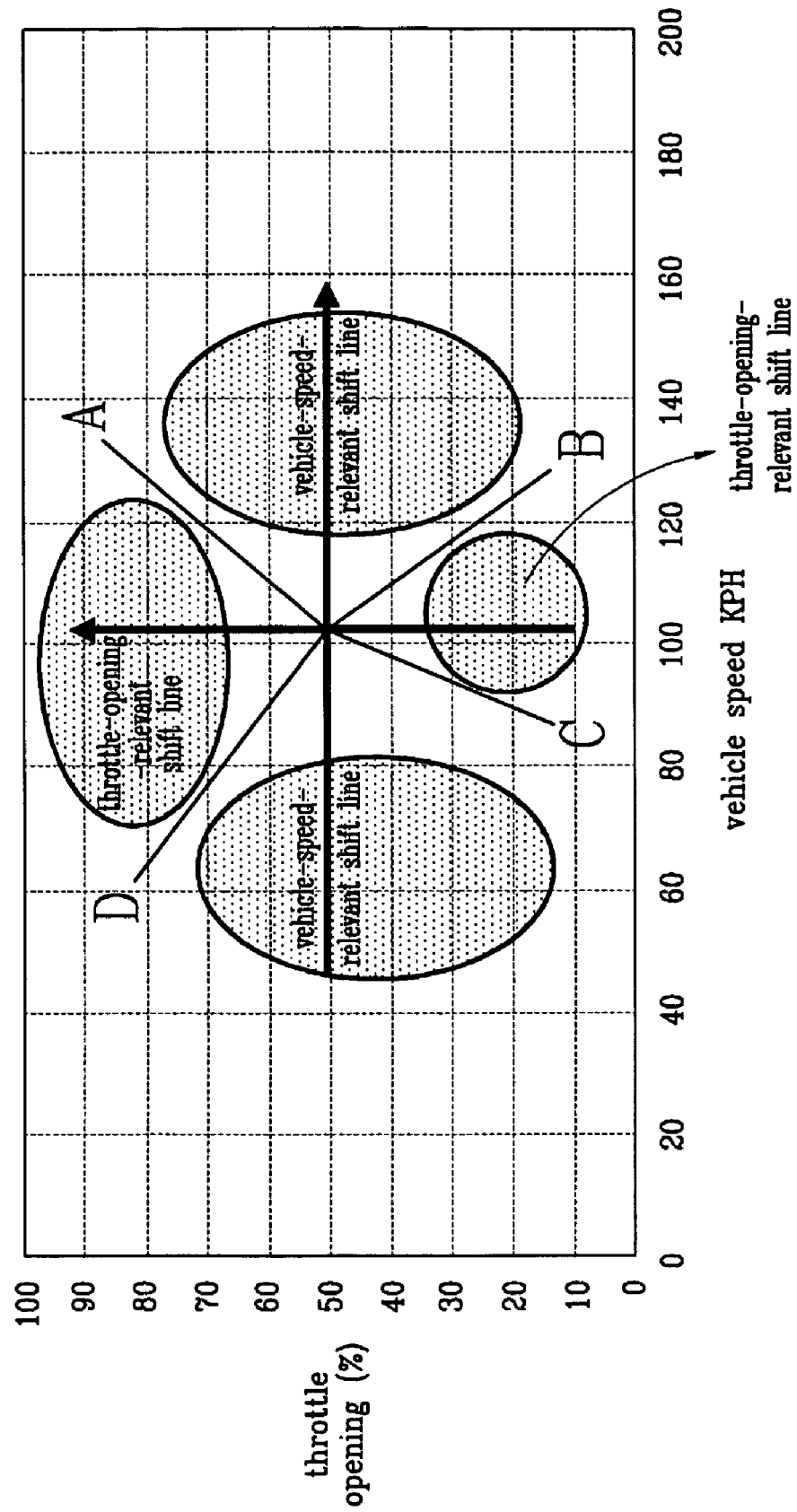
FIG. 5 shows an example of a method for selecting one shift line from a vehicle-speed-relevant shift line and a throttle-opening-relevant shift line using an operating point changing gradient and a plurality of reference gradients for a shift control method according to an embodiment of the present invention.

Referring to FIG. 5, the first reference gradient A is a reference value for a case when a vehicle speed change and a throttle opening change are respectively positive values, i.e., for a first quadrant in FIG. 5, the second reference gradient B is a reference value for a case when a vehicle speed change is a positive value and a throttle opening change is a negative value, i.e., for a fourth quadrant in FIG. 5, the third reference gradient C is a reference value for a case when a vehicle speed change and a throttle opening change are respectively negative values, i.e., for a third quadrant in FIG. 5, and the fourth reference gradient D is a reference value for a case when a vehicle speed change is a negative value and a throttle opening change is a positive value, i.e., for a second quadrant in FIG. 5.

The reference gradients A, B, C, and D may be tuned for an optimal shift. For example, the reference gradients A, B, C, and D can be set as gradients dividing each quadrant into two portions, i.e., 1, −1, 1, −1. Such predetermined reference gradients may be stored in the TCU 40.

Therefore, the reference gradient that will be compared to the calculated gradient S is selected depending on whether the calculated vehicle speed change ΔKPH and the calculated throttle opening change ΔTH are a positive value or a negative value. That is, a shift control method according to an embodiment of the present invention selects one shift line from the vehicle-speed-relevant shift line and the throttle-opening-relevant shift line on the basis of current driving conditions, i.e., a vehicle speed change and a throttle opening change, and performs a shift control according to the selected shift line.

If the operating point changing gradient S is corresponding to a region between the reference gradients A and D or a region between the reference gradients B and C, a shift control according to the throttle-opening-relevant shift line is performed. Meanwhile, if the operating point changing gradient S is corresponding to a region between the reference gradients A and B or a region between the reference gradients C and D, a shift control according to the vehicle-speed-relevant shift line is performed.

Figure 6:
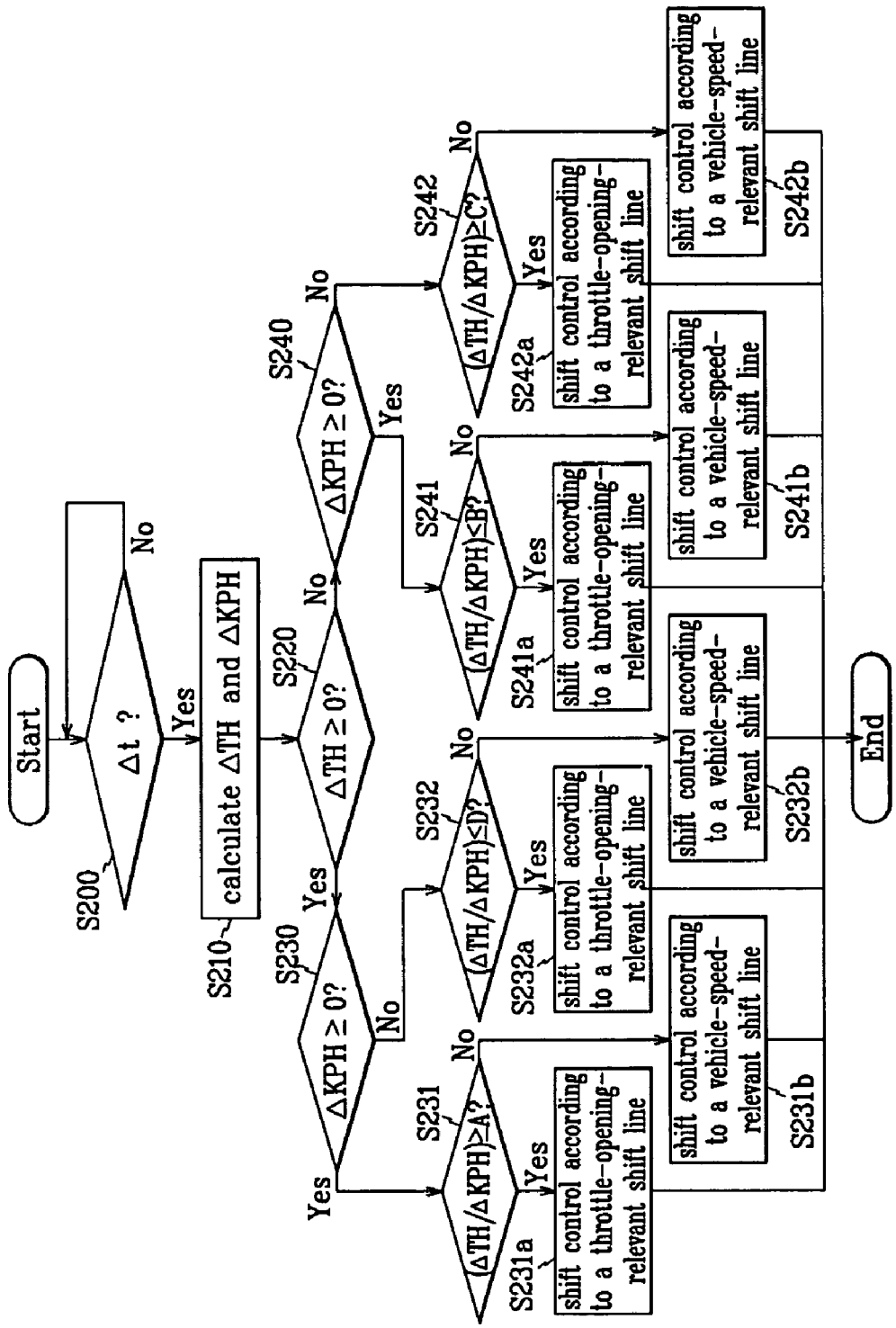
FIG. 6 is a flow chart showing a shift control method according to an embodiment of the present invention.

Referring to FIG. 6, a shift control method performed as stated in the above will be explained in detail hereinafter.

At first, at step S200, the TCU 40 determines whether a predetermined time Δt has elapsed from a last reference point, and if so, at step S210, calculates the throttle opening change ΔTH and the vehicle speed change ΔKPH.

Then, at step S220, the TCU 40 determines whether the calculated throttle opening change ΔTH is greater than "0". If it is determined that the calculated throttle opening change ΔTH is greater than "0" at step S220, the TCU 40 determines whether the vehicle speed change ΔKPH is greater than "0" at step S230.

If it is determined that the vehicle speed change ΔKPH is greater than "0" at step S230, the TCU 40 determines whether the operating point changing gradient S(=ΔTH/ΔKPH), which is calculated as a ratio of the calculated throttle opening change ΔTH to the vehicle speed change ΔKPH, is greater than the first reference gradient A, at step S231.

If the determination of the step S230 is affirmative, i.e., if both the throttle opening change ΔTH and the vehicle speed change ΔKPH are greater than "0", the operating point changing gradient is corresponding to a first quadrant in FIG. 5. Therefore, the calculated operating point changing gradient is compared to the first reference gradient A. In addition, this condition implies that a driver depresses an accelerator pedal to accelerate a vehicle.

If it is determined that the operating point changing gradient ΔTH/ΔKPH is greater than the first reference gradient A in step S231, the TCU 40 performs a shift control according to the throttle-opening-relevant shift line at step S231a. Because this condition implies that the vehicle speed change is relatively small when compared to the throttle opening change (i.e., a depression of an accelerator pedal), a shift control according to the throttle-opening-relevant shift line is performed so that a shift can be delayed to obtain sufficient driving force.

On the other hand, if it is determined that the operating point changing gradient is not greater than the first reference gradient A at step S231, the TCU 40 performs a shift control according to the vehicle-speed-relevant shift line at step S231b. Because the vehicle speed change is relatively greater than the throttle opening change, the vehicle-speed-relevant shift line is preferable.

Meanwhile, if it is determined that the vehicle speed change ΔKPH is not greater than "0" at step S230, the TCU 40 determines whether the operating point changing gradient is less than the fourth reference gradient D at step S232.

If the determination at the step S230 is negative, the operating point changing gradient S corresponds to a second quadrant in FIG. 5. Therefore, the operating point changing gradient S is compared to the fourth reference gradient D. This condition may imply that a vehicle speed is being decreased even though the accelerator pedal is being depressed.

If it is determined that the operating point changing gradient ΔTH/ΔKPH is less than the fourth reference gradient D at step S232, the TCU 40 performs a shift control according to the throttle-opening-relevant shift line at step S232a. Because this condition indicates that the throttle opening change (i.e., depth of an accelerator pedal) is relatively great when compared to a decrease of the vehicle speed, it is preferable that a shift control according to the throttle-opening-relevant shift line is performed to delay a shift so that a sufficient driving force can be obtained.

On the other hand, if it is determined that the operating point changing gradient is not less than the fourth reference gradient D at step S232, the TCU 40 performs a shift control according to the vehicle-speed-relevant shift line at step S232b. Because a decrease of a vehicle speed is relatively great when compared to an increase of the throttle opening, a shift control according to the vehicle-speed-relevant shift line is preferable.

In addition, if it is determined that the throttle opening change ΔTH is not greater than "0" at step S220, the TCU 40, at step S240, determines whether the vehicle speed change ΔKPH is greater than "0".

If it is determined that the vehicle speed change ΔKPH is greater than "0" at step S240, the TCU 40 determines whether the operating point changing gradient S(=ΔTH/ΔKPH) is less than the second reference gradient B, at step S241.

If the determination of the step S240 is affirmative, i.e., if the throttle opening change ΔTH is not greater than "0" and the vehicle speed change ΔKPH is greater than "0", the operating point changing gradient is corresponding to a fourth quadrant in FIG. 5. Therefore, the calculated operating point changing gradient is compared to the second reference gradient B. In addition, this conditions implies that the an accelerator pedal is being returned while a vehicle speed increases, for example, a lift-foot-up state.

If it is determined that the operating point changing gradient ΔTH/ΔKPH is less than the second reference gradient B in step S241, the TCU 40 performs a shift control according to the throttle-opening-relevant shift line at step S241a. Therefore, unnecessary shifts can be avoided.

On the other hand, if it is determined that the operating point changing gradient is not less than the second reference gradient B at step S241, the TCU 40 performs a shift control according to the vehicle-speed-relevant shift line at step S241b.

Meanwhile, if it is determined that the vehicle speed change ΔKPH is not greater than "0" at step S240, the TCU 40 determines whether the operating point changing gradient is greater than the third reference gradient C at step S242.

If the determination at the step S240 is negative, the operating point changing gradient S corresponds to a third quadrant in FIG. 5. Therefore, the operating point changing gradient S is compared to the third reference gradient C. Under this condition a vehicle is decreased while an accelerator pedal is being returned, so this condition may imply that a vehicle speed is decreased by a driver's intention.

If it is determined that the operating point changing gradient ΔTH/ΔKPH is greater than the third reference gradient C at step S242, the TCU 40 performs a shift control according to the throttle-opening-relevant shift line at step S242a. Therefore, a shift to a lower shift speed can be delayed.

On the other hand, if it is determined that the operating point changing gradient is not greater than the fourth reference gradient C at step S242, the TCU 40 performs a shift control according to the vehicle-speed-relevant shift line at step S242b. Therefore, a shift to a lower shift speed can be accelerated.

According to an embodiment of the present invention, the shift pattern is provided with upshift lines for a vehicle speed change and a throttle opening change and downshift lines for a vehicle speed change and a throttle opening change, and such shift lines can be tuned respectively. Therefore, an optimal shift can be realized using such shift lines under vehicle operating conditions. In addition, unnecessary downshifts before a vehicle stops can be avoided, so that an overall efficiency of an automatic transmission is improved.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A shift control method for an automatic transmission using a shift pattern including at least one vehicle-speed-relevant shift line and at least one throttle-opening-relevant shift line for specific gear-shifting depending on vehicle speed and throttle opening, comprising:
   selecting a shift line from the at least one vehicle-speed-relevant shift line and the at least one throttle-opening-relevant shift line, on the basis of a vehicle speed change and a throttle opening change for a predetermined time; and
   performing a shift control according to the selected shift line,
   wherein the selecting comprises:
      calculating the vehicle speed change and the throttle opening change for the predetermined time;
      selecting one reference gradient from a plurality of predetermined reference gradients, on the basis of the calculated vehicle speed change and the calculated throttle opening change; and
      selecting one shift line from the at least one vehicle-speed-relevant shift line and the at least one throttle-opening-relevant shift line on the basis of a comparison of an operating point changing gradient and the selected reference gradient, the operating point changing gradient being calculated as a ratio of the calculated throttle opening change to the vehicle speed change.

2. The shift control method of claim 1, wherein the plurality of reference gradients comprise:
   a first reference gradient for a case when a vehicle speed change and a throttle opening change are respectively positive values;
   a second reference gradient for a case when the vehicle speed change is a positive value and the throttle opening change is a negative value;
   a third reference gradient for a case when a vehicle speed change and a throttle opening change are respectively negative values; and
   a fourth reference gradient for a case when the vehicle speed change is a negative value and the throttle opening change is a positive value.

3. The shift control method of claim 2, wherein when the calculated vehicle speed change is a negative value and the calculated throttle opening change is a positive value,
   the selecting one reference gradient selects the fourth reference gradient, and
   the selecting one shift line selects the throttle-opening-relevant shift line if the operating point changing gradient is less than the fourth reference gradient and selects the vehicle-speed-relevant shift line if the operating point changing gradient is not less than the fourth reference gradient.

4. The shift control method of claim 2, wherein when the calculated vehicle speed change and the calculated throttle opening change are respectively positive values,
   the selecting one reference gradient selects the first reference gradient, and
   the selecting one shift line selects the throttle-opening-relevant shift line if the operating point changing gradient is greater than the first reference gradient and selects the vehicle-speed-relevant shift line if the operating point changing gradient is not greater than the first reference gradient.

5. The shift control method of claim 2, wherein when the calculated vehicle speed change is a positive value and the calculated throttle opening change is a negative value,
   the selecting one reference gradient selects the second reference gradient, and
   the selecting one shift line selects the throttle-opening-relevant shift line if the operating point changing gradient is less than the second reference gradient and selects the vehicle-speed-relevant shift line if the operating point changing gradient is not less than the second reference gradient.

6. The shift control method of claim 2, wherein when the calculated vehicle speed change and the calculated throttle opening change are respectively negative values,
   the selecting one reference gradient selects the third reference gradient, and
   the selecting one shift line selects the throttle-opening-relevant shift line if the operating point changing gradient is greater than the third reference gradient and selects the vehicle-speed-relevant shift line if the operating point changing gradient is not greater than the third reference gradient.

7. A shift control method for an automatic transmission using a shift pattern including at least one vehicle-speed-relevant shift line and at least one throttle-opening-relevant shift line for specific gear-shifting depending on a vehicle speed and a throttle opening,
   wherein one reference gradient is selected from a plurality of reference gradients depending on whether a vehicle speed change and a throttle opening change for a predetermined time are a positive value or a negative value, and one shift line is selected from at least one vehicle-speed-relevant shift line and at least on throttle-opening-relevant shift line on the basis of a comparison of an operating point changing gradient and the selected reference gradient, the operating point changing gradient being calculated as a ratio of the calculated throttle opening change to the vehicle speed change,
   wherein the plurality of reference gradients comprises:
      a first reference gradient for a case when a vehicle speed change and a throttle opening change are respectively positive values;

a second reference gradient for a case when the vehicle speed change is a positive value and the throttle opening change is a negative value;

a third reference gradient for a case when a vehicle speed change and a throttle opening change are respectively negative values; and a fourth reference gradient for a case when the vehicle speed change is a negative value and the throttle opening change is a positive value, and wherein when the calculated vehicle speed change and the calculated throttle opening change are respectively positive values, the shift control is performed according to the throttle-opening-relevant shift line if the operating point changing gradient is greater than the first reference gradient and according to the vehicle-speed-relevant shift line if the operating point changing gradient is not greater than the first reference gradient, wherein when the calculated vehicle speed change is a positive value and the calculated throttle opening change is a negative value, the shift control is performed according to the throttle-opening-relevant shift line if the operating point changing gradient is less than the second reference gradient and according to the vehicle-speed-relevant shift line if the operating point changing gradient is not less than the second reference gradient, wherein when the calculated vehicle speed change and the calculated throttle opening change are respectively negative values, the shift control is performed according to the throttle-opening-relevant shift line if the operating point changing gradient is greater than the third reference gradient and according to the vehicle-speed-relevant shift line if the operating point changing gradient is not greater than the third reference gradient, and wherein when the calculated vehicle speed change is a negative value and the calculated throttle opening change is a positive value, the shift control is performed according to the throttle-opening-relevant shift line if the operating point changing gradient is less than the fourth reference gradient and according to the vehicle-speed-relevant shift line if the operating point changing gradient is not less than the fourth reference gradient.

8. A shift control system for an automatic transmission, comprising:

at least one sensor including a vehicle speed sensor for detecting a vehicle speed and a throttle position sensor for detecting a throttle opening;

a control unit for performing a shift control on the basis of signals from the at least one sensor; and a shift control actuator for performing a specific shift in response to the shift control of the control unit, wherein the control unit stores a plurality of reference gradients depending on whether a vehicle speed change and a throttle opening change for a predetermined time are a positive value or a negative value and at least one vehicle-speed-relevant shift line and at least one throttle-opening-relevant shift line for specific gear-shifting depending on a vehicle speed and a throttle opening, and wherein the control unit executes instructions for selecting a shift line from the at least one vehicle-speed-relevant shift line and the at least one throttle-opening-relevant shift line on the basis of a vehicle speed change and a throttle opening change for a predetermined time, and wherein the control unit is configured to select the shift line by:

calculating the vehicle speed change and the throttle opening change for the predetermined time;

selecting one reference gradient from a plurality of predetermined reference gradients, on the basis of the calculated vehicle speed change and the calculated throttle opening change; and selecting one shift line from the at least one vehicle-speed-relevant shift line and the at least one throttle-opening-relevant shift line, on the basis of a comparison of an operating point changing gradient and the selected reference gradient, the operating point changing gradient being calculated as a ratio of the calculated throttle opening change to the vehicle speed change.

9. The shift control system of claim 8, wherein the plurality of reference gradients comprise:

a first reference gradient for a case when a vehicle speed change and a throttle opening change are respectively positive values;

a second reference gradient for a case when the vehicle speed change is a positive value and the throttle opening change is a negative value;

a third reference gradient for a case when a vehicle speed change and a throttle opening change are respectively negative values; and a fourth reference gradient for a case when the vehicle speed change is a negative value and the throttle opening change is a positive value.

10. The shift control system of claim 9, wherein when the calculated vehicle speed change and the calculated throttle opening change are respectively positive values, the selecting one reference gradient selects the first reference gradient, and the selecting one shift line selects the throttle-opening-relevant shift line if the operating point changing gradient is greater than the first reference gradient and selects the vehicle-speed-relevant shift line if the operating point changing gradient is not greater than the first reference gradient.

11. The shift control system of claim 9, wherein when the calculated vehicle speed change is a positive value and the calculated throttle opening change is a negative value, the selecting one reference gradient selects the second reference gradient, and the selecting one shift line selects the throttle-opening-relevant shift line if the operating point changing gradient is less than the second reference gradient and selects the vehicle-speed-relevant shift line if the operating point changing gradient is not less than the second reference gradient.

12. The shift control system of claim 9, wherein when the calculated vehicle speed change and the calculated throttle opening change are respectively negative values, the selecting one reference gradient selects the third reference gradient, and the selecting one shift line selects the throttle-opening-relevant shift line if the operating point changing gradient is greater than the third reference gradient and selects the vehicle-speed-relevant shift line if the operating point changing gradient is not greater than the third reference gradient.

13. The shift control system of claim 9, wherein when the calculated vehicle speed change is a negative value and the calculated throttle opening change is a positive value, the selecting one reference gradient selects the fourth reference gradient, and the selecting one shift line selects the throttle-opening-relevant shift line if the operating point changing gradient is less than the fourth reference gradient and selects the vehicle-speed-relevant shift line if the operating point changing gradient is not less than the fourth reference gradient.

* * * * *